(12) United States Patent
Thomas et al.

(10) Patent No.: US 6,460,052 B1
(45) Date of Patent: Oct. 1, 2002

(54) METHOD AND SYSTEM FOR PERFORMING FINE GRAIN VERSIONING

(75) Inventors: Peter Rex Thomas, Winkfield; David Bradshaw, Camberley, both of (GB); Jay Gitterman, Palo Alto, CA (US); Timothy Nicholas Scott, Ascot (GB)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/378,396

(22) Filed: Aug. 20, 1999

(51) Int. Cl.[7] .............................................. G07F 12/00
(52) U.S. Cl. .............................. 707/203; 707/1; 707/8; 707/100; 707/104.1; 707/200; 707/201; 707/511
(58) Field of Search ............................ 707/8, 203, 511, 707/11, 1–6, 100–104.1, 200; 717/3, 11

(56) References Cited

U.S. PATENT DOCUMENTS

| | | | | |
|---|---|---|---|---|
| 5,261,098 A | * | 11/1993 | Katin et al. .................. | 395/650 |
| 5,467,471 A | * | 11/1995 | Bader .......................... | 395/600 |
| 5,574,898 A | | 11/1996 | Leblang et al. ............. | 395/601 |
| 5,596,714 A | | 1/1997 | Connell .................. | 395/183.14 |
| 5,649,200 A | | 7/1997 | Leblang et al. ............. | 395/703 |
| 5,675,802 A | | 10/1997 | Allen et al. .................. | 395/703 |
| 5,752,245 A | * | 5/1998 | Parrish et al. ................. | 707/10 |
| 5,758,337 A | * | 5/1998 | Hammond ...................... | 707/3 |
| 5,805,889 A | | 9/1998 | Van De Vanter ............ | 395/703 |
| 5,905,990 A | * | 5/1999 | Inglett ........................ | 707/200 |
| 6,119,130 A | * | 9/2000 | Nguyen et al. ............... | 707/203 |
| 6,148,308 A | * | 11/2000 | Neubauer et al. ........... | 707/203 |
| 6,216,136 B1 | * | 4/2001 | Ronstrom .................... | 707/203 |

OTHER PUBLICATIONS

Jordan, M., et al., "Software Configuration Management in an Object Oriented Database," USENIX Conf. On Object-Oriented Technologies (COOTS), Monterey, CA Jun. 26–29, 1995.

Version Control Systems Generally Available "Free," http://www.loria.fr/~molli/cm/cm–FAQ/cm–tools–6.html, Dec. 8, 1998, pp. 1–4.

"Commercial Configuration Management Tools,", http://www.loria.fr/~molli/cm/cm–FAQ/cm–tools–7.html, Dec. 8, 1998, pp. 1–9.

"CM Tools With World Wide Web Sites," http://www.lori-a.fr/~molli/cm/cm–FAQ/cm–tools–9.html, Jul. 8, 1998, pp. 1–2.

"VMS to Linux HOWTO: Useful Programs," http://www.linux.ncsu.edu/LDP/HOWTO/VMS–to–Linux–HOWTO–10.html, Jul. 29, 1998, pp. 1–3.

"RCS MINI–HOWTO; Overview of RCS," http://www-.dragon.com.au/linux/LDP/HOWTO/mini/RCS–1.html, Jul. 29, 1998, p. 1.

"Cyclic RCS page," http://www.cyclic.com/cyclic–pages/rcs.html, Jul. 29, 1998, pp. 1–3.

"rcs.sc," http://w3.elka.pw.edu.pl/xcoral/node67.html, Jul. 29, 1998, pp. 1–2.

Gray, Jim, et al., "Transaction Processing: Concepts and Techniques," Morgan Kaufmann Publishers, San Francisco, CA, 1993, pp. 435–437.

Thompson, Charles, "Comparing Three Leading DBMS Vendors' Approaches to Replication," DBMS—May 1997—Database Replication, http://www.dbmsmag.com/9705d15.html, pp. 1–10.

* cited by examiner

*Primary Examiner*—Greta L. Robinson
*Assistant Examiner*—Harold E. Dodds, Jr.
(74) *Attorney, Agent, or Firm*—Hickman Palermo Truong & Becker LLP; Carl L. Brandt; Edward A. Becker

(57) ABSTRACT

A method and apparatus are provided for converting a non-versioned schema to a version-enabled schema. The method includes reading a first set of table definitions that belong to the non-versioned schema. A second set of table definitions is generated for the version-enabled schema such that each table definition in the second set of table definitions corresponds to a table definition in the first set of table. Each table definition in the second set of table definitions includes columns that correspond to the columns of the corresponding table definition in the first set of table definitions and one or more additional columns for storing version information. Multiple versions of a particular object are stored within the table. In response to a request from a user to retrieve the particular object, a version of the particular object to present to the user is determined based on a workspace associated with the user. The version of the particular object is presented to the user without exposing values from the second set of one or more columns to the user.

34 Claims, 7 Drawing Sheets

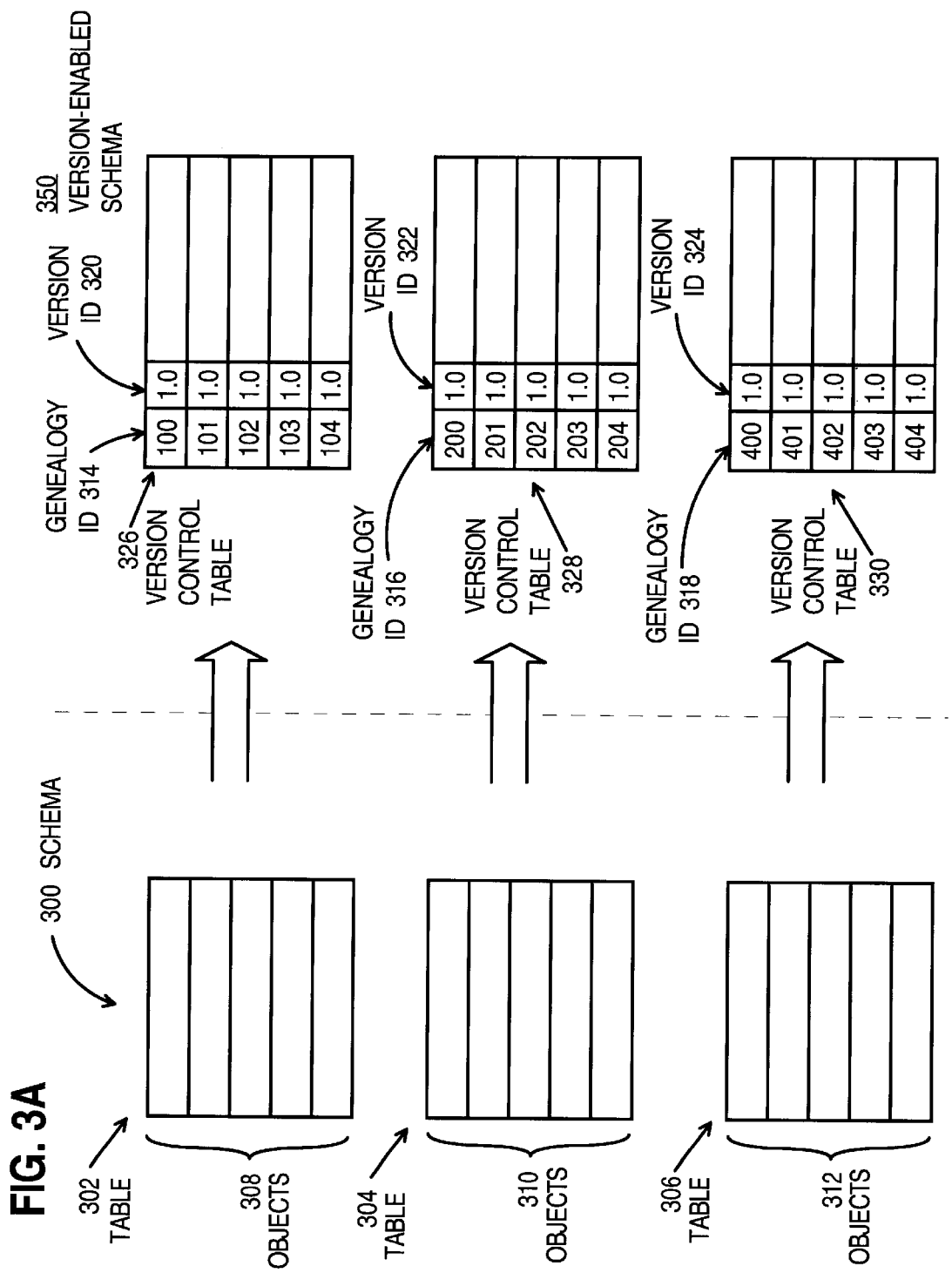

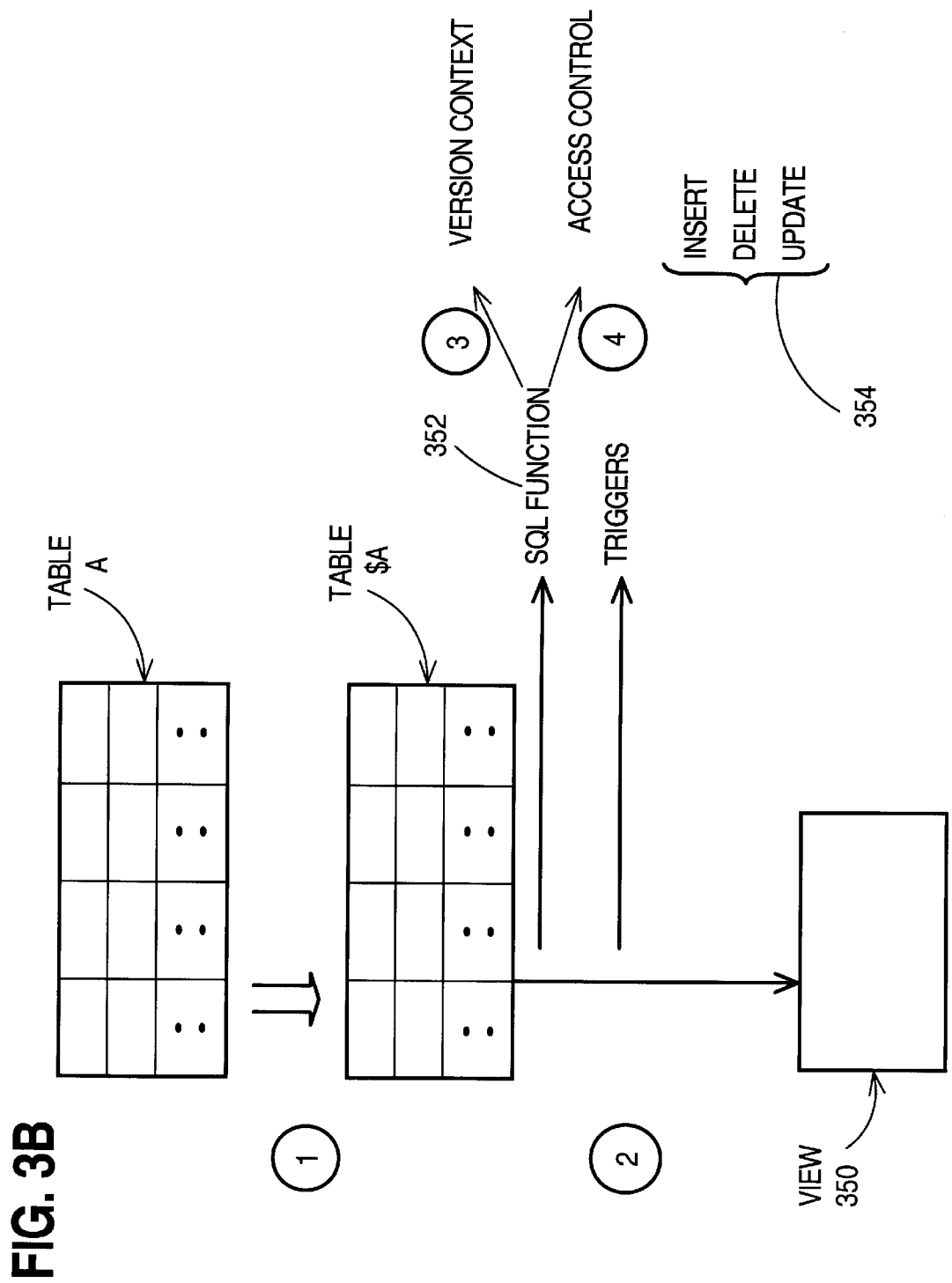

METHOD AND SYSTEM FOR PERFORMING FINE GRAIN VERSIONING

COPYRIGHT AUTHORIZATION

A portion of the disclosure of this patent document contains material that is subject to copyright protection. The copyright owner has no objection to the facsimile reproduction by any one of the patent disclosures, as it appears in the U.S. Patent & Trademark Office patent files or records, but otherwise reserves all copyright rights whatsoever.

COMPUTER PROGRAM LISTING APPENDIX ON COMPACT DISC

A computer program listing appendix on compact disc is included as part of this application and the contents of the compact discs are incorporated herein by reference in their entirety for all purposes. The computer program listing appendix includes two compact discs (including duplicates) that are identical copies of each other. Each compact disc contains a file named "AppendixA.txt", created on Nov. 15, 2001 and having the size of 42,689 bytes.

FIELD OF THE INVENTION

The present invention generally relates to software configuration management systems and more specifically to implementing fine grain versioning within software configuration management systems.

BACKGROUND OF THE INVENTION

Configuration management plays an important role in the development of most software products. In particular, configuration management tools, such as Source Code Control System (SCCS), Revision Control System (RCS) and Clear-Case by Atria, provide versioning tools that regulate and manage how software is developed by tracking the updates and modifications that are made to the software components managed by the tools.

For example, in a typical software development project, for a particular product or software release, many different software components may need to be generated. Typically, numerous software developers are involved in the generation of the software components in a software release. To facilitate software development, the software developers are typically allowed to access and modify many of the same software components. To provide for common access, the software components are commonly maintained in a data repository that is accessible by the different software developers. The data repository may reside on a single computer system or may be maintained across multiple computer systems.

For most configuration management systems, such as SCCS, RCS and ClearCase, the versioning tools are file-based and therefore provide versioning at a file level granularity. When a software developer wants to modify a particular software component, he or she is required to "check-out" the file that includes the software component. In checking-out the file, a new "version" of the file is generated and brought into the software developer's current work area. The software developer may then update and modify the file as necessary. Thereafter, the software developer can make the modifications visible to the other software developers by "checking-in" the new file version back into the data repository.

As a file is repeatedly checked out and checked back in, numerous versions of that file will be generated. The files that are versions of a particular file are collectively referred to herein as the "version set" of the file.

A drawback with using a file-based versioning tools is that certain data or information does not fit within the file-based paradigm, and therefore cannot be effectively managed within the configuration management systems that are tied to the file-based paradigm. For example, file-based versioning tools do not provide versioning at finer level of granularity than files, such as versioning of the individual software components within files.

During the first phase of a project, a set of requirements is often generated to ensure that all of the project goals are met. Each requirement may then be mapped to a particular function or software component using a spreadsheet, database or other mapping mechanism. In this manner, the mapping can be performed by linking each spreadsheet cell or table entry with a particular software module. Once the requirements are mapped, a second phase is initiated in which the software developers proceed to develop software components for which the requirements have been mapped. However, because the requirement mapping is performed at the requirement-to-component granularity, and not at a file level granularity, if a software developer determines that a particular requirement should be performed by a different software component, or that a software component should be split into two separate components, the requirement mapping can quickly become outdated as the file-based versioning tool will not maintain a correct mapping.

Another drawback with file-based versioning tools is that they do not support versioning at a level of granularity that is coarser than individual files, such as versioning of groups of related files. For example, FIG. 1 illustrates a system 100 in which a conventional versioning control mechanism has been implemented. In this example, version sets 104, 106, 108 and 110 respectively correspond to files A, B, C and D. As depicted in FIG. 1, for many file-based versioning tools, such as RCS or ClearCase, a stripe or label 102 may be generated which includes a particular version of each file within the data repository. The stripe or label 102 may represent a particular product or software release. However, because file-based versioning tools such as RCS or Clear-Case can only perform versioning at the file level granularity, to use the strip or label as part of another system, the file versions that belong to the stripe must be manually copied into a separate data repository. Thus, the correlation between the file versions within the stripe or label and the file versions copied into the separate repository are lost.

Based on the foregoing, there is a need to provide a configuration management system in which versioning of software components can be performed at finer and coarser granularities than is provided by the conventional file-based versioning systems.

SUMMARY OF THE INVENTION

The foregoing needs, and other needs and objects that will become apparent from the following description, are achieved in the present invention, which comprises, in one aspect, a method for implementing fine grain versioning within software configuration management systems, the method comprising the computer-implemented steps for converting a non-versioned schema to a version-enabled schema. The method includes reading a first set of table definitions that belong to the non-versioned schema. A second set of table definitions is generated for the version-enabled schema such that each table definition in the second set of table definitions corresponds to a table definition in the first set of table. Each table definition in the second set of table definitions includes columns that correspond to the columns of the corresponding table definition in the first set of table definitions and one or more additional columns for storing version information.

In another aspect, a method for providing version support for objects stored in a relational database system is provided. The method includes creating a table that includes a first set of one or more columns for storing values that correspond to attributes of objects, and a second set of one or more columns for storing object version information. Multiple versions of a particular object are stored within the table. In response to a request from a user to retrieve the particular object, a version of the particular object to present to the user is determined based on a workspace associated with the user. The version of the particular object is presented to the user without exposing values from the second set of one or more columns to the user.

The invention also encompasses a computer-readable medium, and a computer system, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A illustrates an example of how a schema may be registered into a repository using the version control mechanism;

FIG. 3B illustrates an example of a registration process in which a primary key or uniqueness constraint is translated into a trigger so as to evaluate the constraint relative to the view that is being projected;

DETAILED DESCRIPTION OF THE PREFERRED EMBODIMENT

Figure 1:
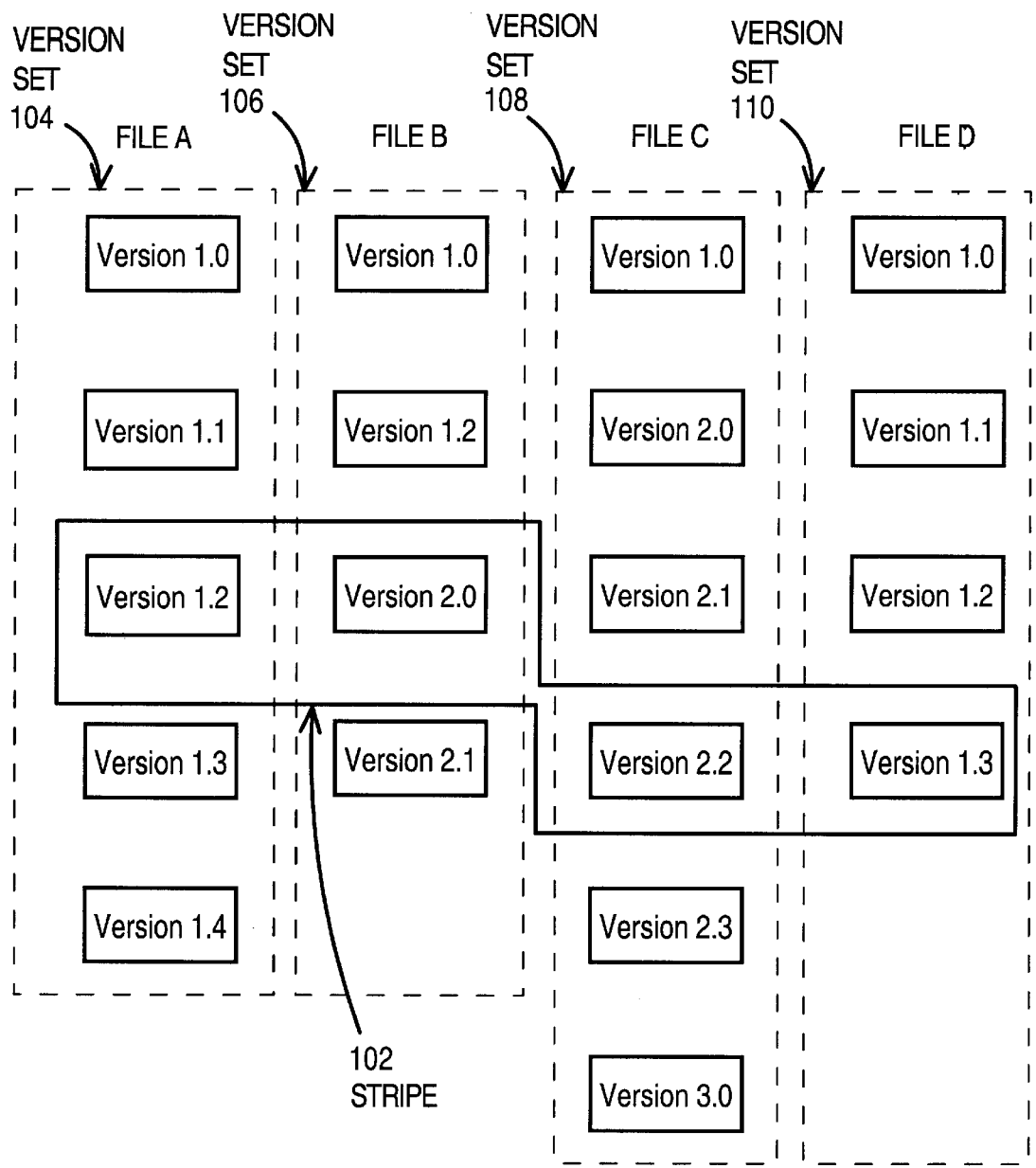
FIG. 1 illustrates a system in which a conventional versioning control mechanism has been implemented.

A method and apparatus for performing fine grain version control is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A version control mechanism is provided for performing configuration management for managing large assemblies of software components. In particular, the version control mechanism supports configuration management of both non-structured data, such as file-based data, and structured data, such as information stored within a database table.

In one embodiment, the version control mechanism employs a relational database as the repository for the components for which it performs version management. The version control mechanism provides version control at the object level, where an object may correspond, for example, to the data in a row of a relational database table. In this manner, the version control mechanism allows versioning to be performed on any object that may be stored in a table within a relational database. In addition, because the system is implemented using a relational database, the version control mechanism can take advantage of the transactional support provided by database systems. For example, updates made during an update transaction may be automatically rolled back if the update transaction does not properly complete.

The repository used by the version control mechanism serves as a persistent store for the objects managed by the version control mechanism. The repository is further used by the version control mechanism to store metadata that is used to keep track of an object's evolution over time. The repository provides an open and extensible information model which allows data to be defined in a structured form as database objects. When a relational database is used as the repository of the version control system, the database objects stored in the repository may be accessed using the database language supported by the relational database system, such as the SQL query language.

Unlike file-based versioning systems, the objects that are versioned in the repository may be versioned at finer or coarser granularities than file-level granularity. Thus, while each object in the repository has a version set, the individual elements within the version set of an object will not necessarily be files, but rather will reflect the same granularity as the versioned object. Each element in the version set of an object is called an "object version" of that object, and represents the state of the object at a certain point in time. The object versions of a version set are linked together by associations that record how each object version evolved from its predecessor(s). Repositories will be described in further detail below.

When information objects are stored in a relational database that does not have a version control mechanism, they are generally stored in rows of one or more tables, where the tables have columns for storing the values of the various attributes of the objects. To allow for versioning at the object level, an object identity scheme is provided in which the tables holding the objects store, in addition to the values of the attributes of the objects, identification information used for tracking the evolution of the objects. In one embodiment, the additional identification information includes a genealogy ID and a unique version ID. The genealogy ID uniquely identifies a versioned object. All object versions within a version set represent the same versioned object (albeit at different points in time) and therefore all have the same genealogy ID. The unique version ID identifies the specific version of that object. Thus, each object version in a version set has a different version ID. The object identity scheme is described in further detail below.

Accessing Objects in the Repository

While the repository may maintain multiple versions of a versioned object, it is not desirable for users to see all versions of an object. Rather, it is desirable to present the appropriate object versions to a user while having the existence of other object versions of the same objects transparent to the user. According to one embodiment, the maintenance of multiple object versions is made transparent to users by having those users access objects through views.

A view is a logical table. As logical tables, views may be queried by users as if they were a table. However, views actually present data that is extracted or derived from existing tables. Thus, the problem described above may be solved by (1) creating a view that extracts only those object versions that are appropriate for a user, and (2) having the user access the objects through the view.

According to one embodiment, the version control mechanism maintains a user workspace for each user. The user workspace of a user includes an object version of each of the objects that have been "checked-out" by the user. The version control mechanism protects the object versions in a user's workspace from changes by other developers.

In one embodiment, each user has a "working context" that defines the set of objects that can be seen by the user. The user accesses the user's working context through a "version resolved view".

The working context of a user defines a set of "configurations" that are associated with the user's workspace. As used herein, a configuration is a collection of object versions, where each object version in the configuration is for a different object. Thus, a configuration is similar to an RCS stripe or a label. However, unlike a stripe or label, a configuration is itself an object for which version control may be performed. In certain embodiments, a configuration may be defined as either a fall standing separate version of the objects (i.e., a snapshot of all object versions that belong to the configuration), or as a delta of a previous configuration.

Registration

In addition to providing versioning for objects stored in database schemas created in the repository maintained by the version control mechanism, the version control mechanism is able to import pre-existing database schemas into the repository. During the import process, schemas that previously did not support versioning are augmented in a way that allows them to support versioning. Data from the pre-existing schema may then be imported to populate the version-enabled schema created in the repository. The data thus imported constitutes the first version of each of the imported objects. The process of importing a pre-existing database schema is referred to herein as registration.

The registration process allows relational database information that was generated outside the version control mechanism to be registered into the system. This registration process allows the relational database information to gain the value of version control without having to modify the existing tool set. The registration process is described in detail below.

Repository

A repository is a storage mechanism and a set of management services for the data and metadata that an organization owns. The metadata defines the information technology infrastructure of the enterprise by defining the development environment and tools used to integrate and customize application for the enterprise; defining the applications used across the enterprise and the data required by each application; and defining the data warehouse and decision support systems that assist users in exploiting the information assets of the enterprise to make decisions.

As previously indicated, a repository stores and versions both relational data and file based data. The unit of versioning is determined by the information model registered in the repository, and can be as fine as an individual row in a table. Each versionable unit is referred to a "repository object".

For each repository object, a version set of object versions is maintained along with the history of succession, branching and merging. Sets of specific objects version can be grouped into configurations, which are themselves repository objects that can be versioned and included as part of other configurations. This allows a network of complex component dependencies in an application to be explicitly recorded and maintained under version control.

By providing each user a current working context in which only one version of each object is visible, the database tools can use the repository without having to be aware of the additional complexity that is introduced by version control. In this manner, all work that is performed to track and maintain version information is transparent to the tool. Thus, existing tools that were not designed to support versioning can obtain the benefit of version control without having to be modified.

The repository maintains version history information about the different objects that it stores. For example, the version history information may include such information as who created the object, when the object was created, who has modified the object, when the object was modified, a description of the modifications made to the object, and branch information that indicates where in the version history the object was checked-in. All object versions that are in a version set are said to belong to a "family". In one embodiment, the version control mechanism explicitly records the version association between each of the object versions that belong to the same family.

Object Identity Scheme

Figure 2:
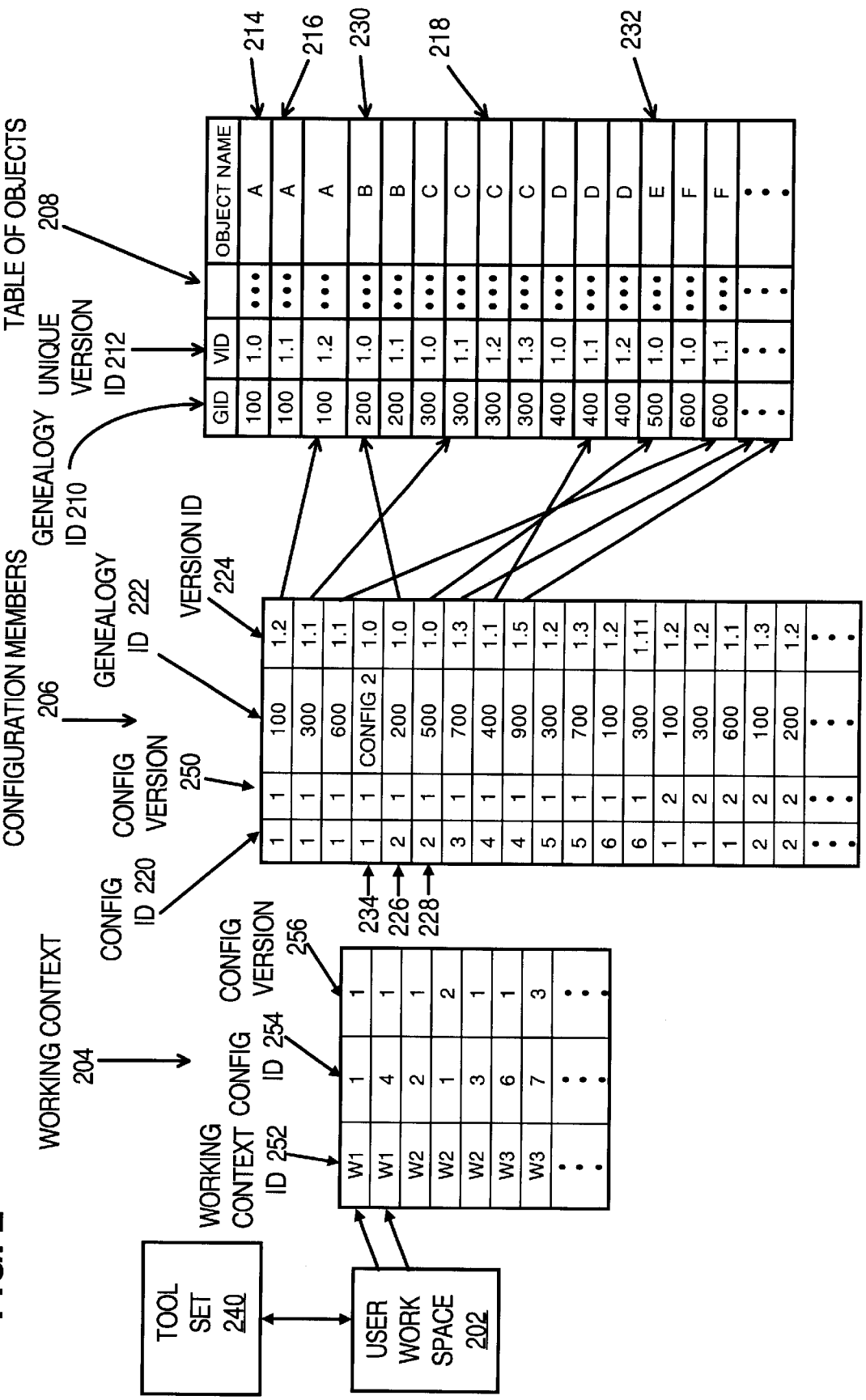
FIG. 2 is a block diagram of a computer system architecture in which the present invention may be utilized.

As previously indicated, the version control mechanism provides an object identity scheme that associates additional identity information with every object version within the repository. FIG. 2 illustrates a repository 200 that includes a table of objects 208, a list of configuration members 206, a working context table 204, a user work space 202 and a set of tools 240. Object table 208 includes a plurality of rows or entries that are each associated with a specific version of a particular object within repository 200.

As depicted, to provide an object identity scheme, a genealogy ID 210 and a unique version ID 212 are associated with each entry in table 208. The genealogy ID 210 stored in a row provides a family history indicator as to the particular family from which the object version that is stored in that row was generated. For example, because entries 214 and 216 have the same genealogy ID ("100"), the object versions associated with entries 214 and 216 can be identified as being from the same family. Alternatively, because entries 214 and 218 do not have the same genealogy ID, the object versions associated with entries 214 and 218 are identified as being from different families. In one embodiment, each genealogy ID is a globally unique identifier that enables the distribution of a particular object across multiple repositories. In certain embodiments, the globally unique identifiers (genealogy IDs) are generated based on a combination of the network ID associated with the process that is creating the object and a current time of day stamp. However, other methods may be used to generate the globally unique identifiers, as embodiments of the invention are not limited to any particular algorithm for generating globally unique identifiers.

The unique version ID 212 identifies a specific object version. In one embodiment, whenever an object is "checked-out", the version control mechanism generates a new version of the object. In this manner, the unique version ID 212 indicates an ordering of when each object version having a particular genealogy ID was created relative to the other object versions that have the same genealogy ID. For example, because the unique version ID of entry 216 ("1.1") is greater than the unique version ID of entry 214 ("1.0"), the version control mechanism can determine that the object version for entry 214 was generated prior to the object version for entry 216. As will be discussed below, the version history supports multiple successors, predecessors and branching and merging of objects within the repository 200.

Configuration members table 206 provides a mapping of configurations to the specific object versions that are associated the configurations. As previously described, a configuration is a collection of objects that are related in some way that is significant to the user. For example, a configuration may represent all the objects that make up a given component or release. Using configuration members table 206, the version control mechanism can identify the specific objects and the specific object versions that make up a particular configuration.

However, because only a single version of a particular object may be included in a user's workspace, the version control mechanism ensures that each object contained in a particular configuration is associated with a genealogy ID that is unique relative to the genealogy IDs of the other objects in the same configuration. For example, a single configuration could not include the object versions that are associated with both entries 214 and 216 because they represent different versions of the same object.

In this example, configuration members table 206 is depicted with columns that store a configuration ID 220, a configuration version ID 250, a genealogy ID 222 and a version ID 224. As respectively indicated by entries 226 and 228, version "1" of configuration "2" includes an object having a genealogy ID of "200" and version ID of "1.0" and an object having a genealogy ID of "500" and version ID of "1.0" that are associated with entries 230 and 232 in object table 208.

In certain embodiments, a configuration itself may actually include other configurations. For example, as depicted by entry 234, the configuration associated with version "1" of configuration ID "1" also includes the objects that are contained in version "1" of configuration Working context table 204 defines the list of configuration objects that are currently mapped to a user's workspace. In one embodiment, each user is provided with a private working context. The working space provides a view of those data items that the user is currently working on ("version resolved view") and protects those data items from being changed by others. A working context may include both structured and non-structured data. Thus, a private working context may include not only file based information but also information that is stored within a table.

In this example, working context table 204 defines a "version resolved view" of the current set of objects that the user is currently working on. When a user asks for data from the database, the user is supplied the data through the views based on the configurations that apply to the user's workspace. In this example, working context table 204 maps version "1" of configuration "1", version "1" of configuration "2" and version "1" of configuration "4" to user workspace 202. Thus, by mapping version "1" of configuration "1", version "1" of configuration "2" and version "1" of configuration "4" to user workspace 202, the user is provided with a version resolved view that includes the object versions that are contained in table 1:

TABLE 1

| VERSION RESOLVED VIEW | |
| --- | --- |
| GENEALOGY | VERSION |
| 100 | 1.2 |
| 300 | 1.1 |
| 600 | 1.1 |
| 200 | 1.0 |
| 500 | 1.0 |
| 400 | 1.2 |
| 900 | 1.5 |

Because only a single version of any given object may be included in a user's workspace, the version control mechanism ensures that the object versions contained in each configuration that is included in working context table 204 have genealogy IDs that are unique relative to all other object versions in all other configurations that are included in the user's workspace. In this example, because version "1" of configuration "1", version "1" of configuration "2" and version "1" of configuration "4" define the objects that are seen by user workspace 202, the version control mechanism must ensure that version "1" of configuration "1", version "1" of configuration "2" and version "1" of configuration "4" do not contain different versions of the same object. For example, a particular working context cannot include both version "1" of configuration "1" and version "2" of configuration "2" as they both include objects having a common genealogy ID of "100".

The tool set 240 represents a set of tools that can be used to access the objects that are projected through the "version resolved view" into user workspace 202. In one embodiment, a set of APIs are provided which allow the tool set 240 to access and manipulate objects that are projected into the "version resolved view" associated with user workspace 202. In particular, the set of APIs provide to the tool set an interface for checking-out, updating and checking-in objects that reside within repository 200.

In certain embodiments, the "version resolved view" includes the unique version ID 212 that is associated with each object in the user workspace 202. In one embodiment, once a tool has obtained the unique version ID for a particular object, the tool may interact with the version control mechanism through an Application Program Interface (API) to navigate the family history of the particular object. In this manner, the tool set 240 may step outside the user workspace area 202 to obtain a history of the objects that are contained within the repository 200.

Registration

In certain cases, prior to implementing the version control mechanism in a particular development system, a user may have previously developed a set of tools that uses data in a relational database. In one embodiment, the information previously developed using the set of tools, and the schema used to store it, may be registered with the version control mechanism to gain the benefits of version control. To register a schema, the version control mechanism takes each table of the schema and creates within the repository a table that is identical to the original except that it adds object identity information to the generated table. In one embodiment, to add the object identification information, the version control mechanism expands each table of the schema to include both a genealogy ID column and a unique version ID column. In certain embodiments, in registering the schema, the version control mechanism inserts a default genealogy ID and unique version ID value in the genealogy ID column and unique version ID column for each table entry.

In addition, the version control mechanism records any foreign keys or constraints that are associated with the schema. How foreign keys are recorded is described in detail below.

Once registered, the user may continue to access and manipulate data through the set of existing tools. However, transparent to those tools, the data upon which the tools operate is versioned. This registration process allows a set of existing tools to continue to be used without having to incur any cost of having to modify the tools. This is particularly important in many development environments as the user will be able to continue to use the existing tools in conjunction with any new tools that are currently being developed.

For example, a database schema having a particular set of constraints and indexes may have been previously developed outside the version control mechanism. To register the schema, the version control mechanism uses the schema definition to create a "version enabled" schema. To generate the "version enabled" schema, the version control mechanism creates a copy of each table contained in the existing schema and associates a set of object identities (genealogy ID and unique version ID) with each table copy. In one embodiment, in registering a schema, the repository metadata is updated or "populated" to include the newly generated version enabled schema information.

FIG. 3A illustrates an example of how a schema 300 that was created by a set of existing tools may be registered into a repository using the version control mechanism. In this example, the schema 300 includes a set tables 302, 304 and 306. Tables 302, 304 and 306 respectively include a set of objects 308, 310 and 312 that may be accessed and manipulated using the existing tool set. To register schema 300, a version enabled schema 350 is generated based on schema 300 wherein the version control mechanism generates a copy of each table (302, 304 and 306) and respectively adds genealogy IDs 314, 316 and 318 and version IDs 320, 322 and 324 to create a group of initial version control tables 326, 328 and 330. Although not depicted, in registering schema 300, additional version history information, such as who created the object, when the object was created, who has modified the object, when the object was modified, a description of the modifications made to the object, and branch information that indicates where in the version history the object was checked-in will generally be included in the version enabled schema 350.

Once a schema is registered, the version control mechanism generates view definitions to create views that project the information as it was originally viewed by the existing tools. When the tools submit queries to retrieve data from the repository, the queries are submitted through the views. In response to such queries, the version control mechanism determines the user's working context and retrieves the information that (1) satisfies the search criteria of the queries and (2) belongs to the user's working context, as previously described in FIG. 2.

According to one embodiment, all rows that satisfy the search criteria of a received query are initially retrieved. The rows thus retrieved will include all rows that satisfy the search criteria, including rows that do not belong to the user's working context. The version control mechanism filters from the result set the rows for object versions that do not belong to the user's working contexts by performing a simple join back to the rows in the configuration members table 206 that correspond to configurations in the user's working contexts. After the rows that do not correspond to object versions that are in the user's working contexts have been filtered, the version control mechanism strips off any added object identity information (genealogy ID and unique version ID) and projects the data to the existing tools. Thus, the existing tool set can continue to use its normal SQL queries to access the data as if it still existed in the old tables.

Unique Key Transformations

When a schema is registered, the version control mechanism must record all of the schema's constraint information and unique key information into the "version-enabled" schema. However, because the created tables will contain multiple versions of the same objects, any constraint or unique key information will no longer be unique. This can cause the tool to fail since all of its SQL is written for the uniqueness constraints that were generated for the particular set of tools.

In certain embodiments, when registering a schema, the version control mechanism transforms the declarative unique and corresponding foreign keys into a procedural form of evaluation to allow the unique and foreign key constraints to be evaluated within the context of the version control mechanism. In one embodiment, when an object is created within a table, a table of records is generated that identifies each constraint that will needs to be checked before an operation involving the object can complete. In particular, when an operation associated with the object completes, the version control mechanism runs through the table of records and procedurally validates the constraints. Appendix A includes an example of a script that depicts the creation and then registration of a "sample" schema. This example also illustrates how, through a user workarea, non-version aware SQL statements may be used to transparently perform operations on the objects after they have been registered within the repository.

When registering a schema, the version control mechanism changes the database primary keys to the unique version ID. The original primary key, unique key and foreign key constraints are re-implemented as functions that are invoked by database triggers whenever the content of a version resolved view is changed or the values of an object are modified.

To enforce a uniqueness constraint, the constraint needs to be enforced relative to the configuration associated with the workspace area that the user is using. Thus, if the name of an object is subject to a uniqueness constraint, then different objects may be named the same only if they exist in different workspace areas. For example, workspace "A" may include an object named "Fred" at the same time workspace "B" includes a different object named "Fred". However, these two objects, both named "Fred", may not coexist in the same workspace area. In certain embodiments, when registering a schema, the version control mechanism ensures that uniqueness constraints are maintained for all workspace areas. In one embodiment, when registering a schema, the version control mechanism transforms the declarative foreign keys into a procedural form of evaluation to allow the foreign keys to be evaluated within the context of the version control mechanism. In one embodiment, when an object is created within a table, a table of records is generated that identifies each constraint that will needs to be checked before an operation involving the object can complete. In particular, when an operation associated with the object completes, the version control mechanism runs through the table of records and procedurally validates the constraints. Appendix A includes an example of a "sample. sql" script that illustrates the registration process. The results of executing the script are depicted in "sample.txt" which contains descriptions of the input objects and a list of the resulting repository objects. The "constraint.txt" file includes descriptions of the constraints that are transformed during the registration process.

In certain embodiments, if a primary key or uniqueness constraint is on a name, then during registration, the primary key or uniqueness constraint is translated to a trigger that evaluates the constraint relative to the view that is being projected. In particular, the triggers are used to ensure that an operation is performed on the correct version of the object, to validate that the user has the necessary access rights for performing the operation, and to ensure that the results are projected back into the user's view.

FIG. 3B illustrates an example of a registration process in which a primary key or uniqueness constraint is translated into a trigger that can be used to evaluate the constraint relative to the view that is being projected. As depicted, at state 1, the registration process renames versioned enabled TABLE A to TABLE $A and creates a view 350 (state 2). To create the view 350, the registration process selects objects from TABLE $A by calling a SQL function 352 that determines which of the objects in TABLE $A are allowed to be seen through the view 350. In one embodiment, to determine which objects can be seen in the view 350, the SQL function 352 at state 3 evaluates the version context to determine the particular version of the object that is to be viewed, and at state 4, evaluates the access control rights of the user to determine whether the user is allowed to see and/or modify the particular object.

Associated with TABLE $A is a set of triggers 354. When an object is inserted, deleted or updated within the view 350, the triggers evaluate the access control to determine whether or not the operation can be performed. If the operation is allowed, the triggers construct the subordinate SQL that is necessary to insert, delete or update the object within the TABLE $A and create the configuration members so that the object can be seen in a subsequent select operation back through the view 350, inserts the object into the current working folder so that it will be seen when navigating the folder, and does the background evaluation of the constraints for generating the corresponding version history information.

Registration Sequence

Figure 5:
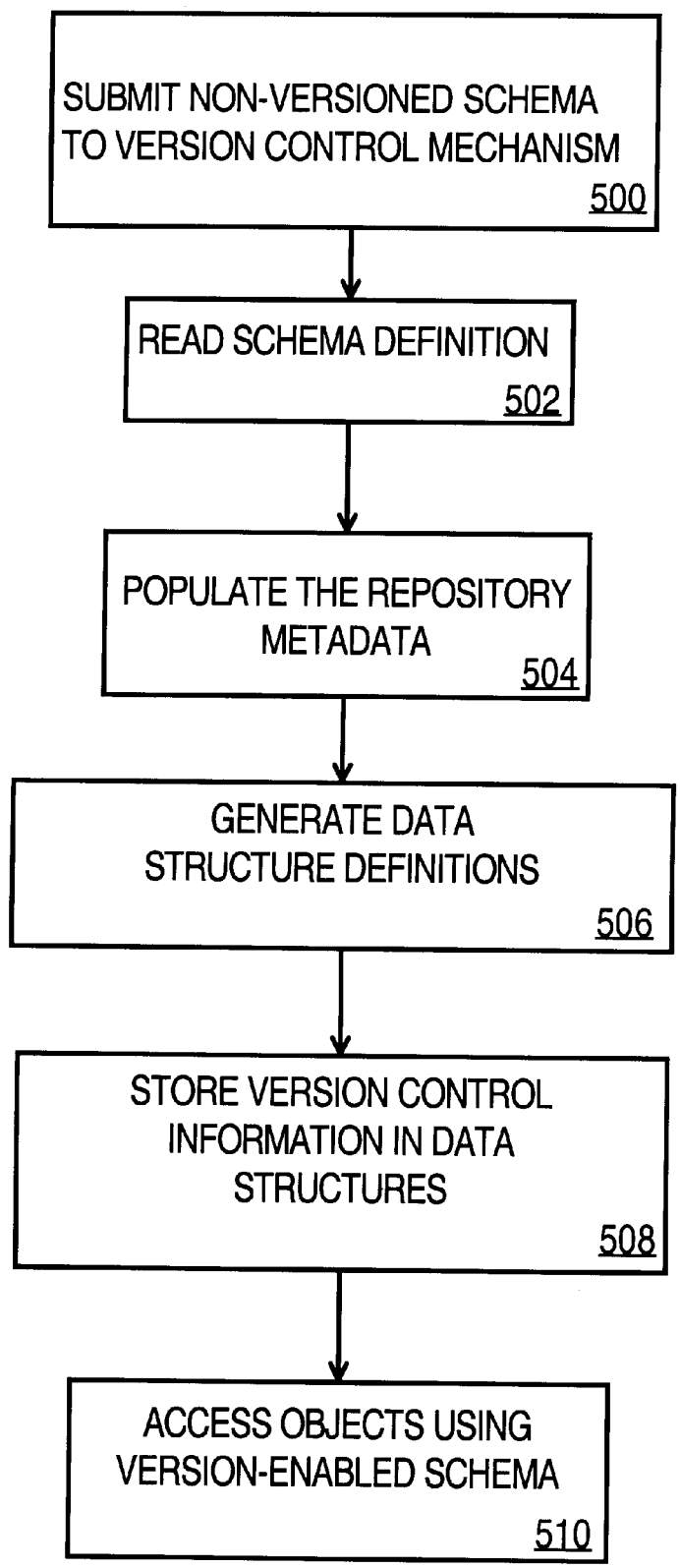
FIG. 5 is a flow diagram of a method for registering a schema with the version control mechanism.

FIG. 5 is a flow diagram of a method for registering a previously defined, non-versioned schema with the version control mechanism. The non-versioned schema may have been previously created by or for an existing tool. For example, a tool or set of tools may have generated a relational database schema that does not implement version control.

At step 500, a schema is submitted to the version control mechanism for registration.

At step 502, the version control mechanism reads the non-versioned schema. In one embodiment, in reading the non-version schema, the version control mechanism reads the on-line data dictionary to identify and read the database object information (tables, views, functions, packages, constraints, etc.) that is to be included in the version controlled schema.

At step 504, the repository metadata is populated to include the identified database object information. At this point, the repository includes all the necessary information that will be required to manage the new version controlled objects.

At step 506, the database structures are generated to support the new version controlled objects. In one embodiment, the generated database structures include tables that contain added versioning columns, a view with the version and access control context clause, triggers that are associated with the tables to implement the version control operations (i.e., determining the particular version of the object that is to be viewed and whether the user is allowed to see and/or modify the different objects), and a set of packages that encapsulate the objects with an API for the set of tools to perform such operations as checkout and check-in of the objects. In generating the database structures, as previously described, constraints (such as primary keys, foreign keys, delete cascades and uniqueness constraints) are translated into functions so that the constraints can be evaluated within the context of each individual work area.

In addition, any user packages that were previously used on the non-versioned schema are populated into the repository. These user packages can be populated into the repository without modification as the packages will operate on the objects as projected through the view thus causing them to appear identical to the non-versioned objects. This allows the previously defined packages to be executed without requiring an update to their SQL code.

At step 508, the information based on the new version controlled objects is stored within the generated database structures.

At step 510, the tool may continue to access the objects but through the version-enabled schema. In particular, the created view definitions present the data in the version-enabled tables in a way that emulates the way the information was presented in the non-versioning tables, thus making transparent the fact that the underlying information is versioned.

In certain cases, a tool may be implemented to take advantage of the version control mechanism. Thus, the schema generated to store the data that is used by the tool may already be version-enabled. For example, a "new" schema may be generated outside the repository but which is based on the version control mechanism and thus includes table definitions of the objects that already exist in the repository. In one embodiment, the version control mechanism allows the versioning information from a previously registered schema to be removed from or backed out of the repository. Thereafter, the new schema information can be registered with the repository without conflicting with previously registered schema information. This allows a schema to be registered multiple times without causing the unwanted generation of multiple tables or records for the same objects.

In another embodiment, to register the new schema, the version control mechanism creates an association between tables in the new schema and the tables in the existing schema. If the version control mechanism determines that the new schema is already versioned-enabled, an association is performed to match the table of objects between the existing schema and the new schema. The version control mechanism then identifies and filters-out any objects that have already been registered. Thus, if a schema is registered multiple times, the version control mechanism will not generate multiple tables or records for the same objects.

Multiple Repositories

The version control mechanism provides for the versioning of objects across multiple development systems. For example, in one embodiment, the version control mechanism maintains a mapping scheme that allows parts of an object family to be moved from one repository to another. In this manner, a chain of repositories may be maintain such that a version of an object may be generated in a first repository and then later released and modified in second repository. By allowing multiple versions of an object to be maintained in a chain of repositories, the version control mechanism can identify where certain customizations or modifications are going to conflict with the customizations that were made locally. This allows the number of errors to be minimized when comparing or merging two version of the same object during the upgrade of an application. In one embodiment, each object is associated with a globally unique identifier that continues to be associated with each object even when the object is distributed across multiple repositories. This allows a particular object to be tracked and versioned within multiple repositories.

Figure 4:
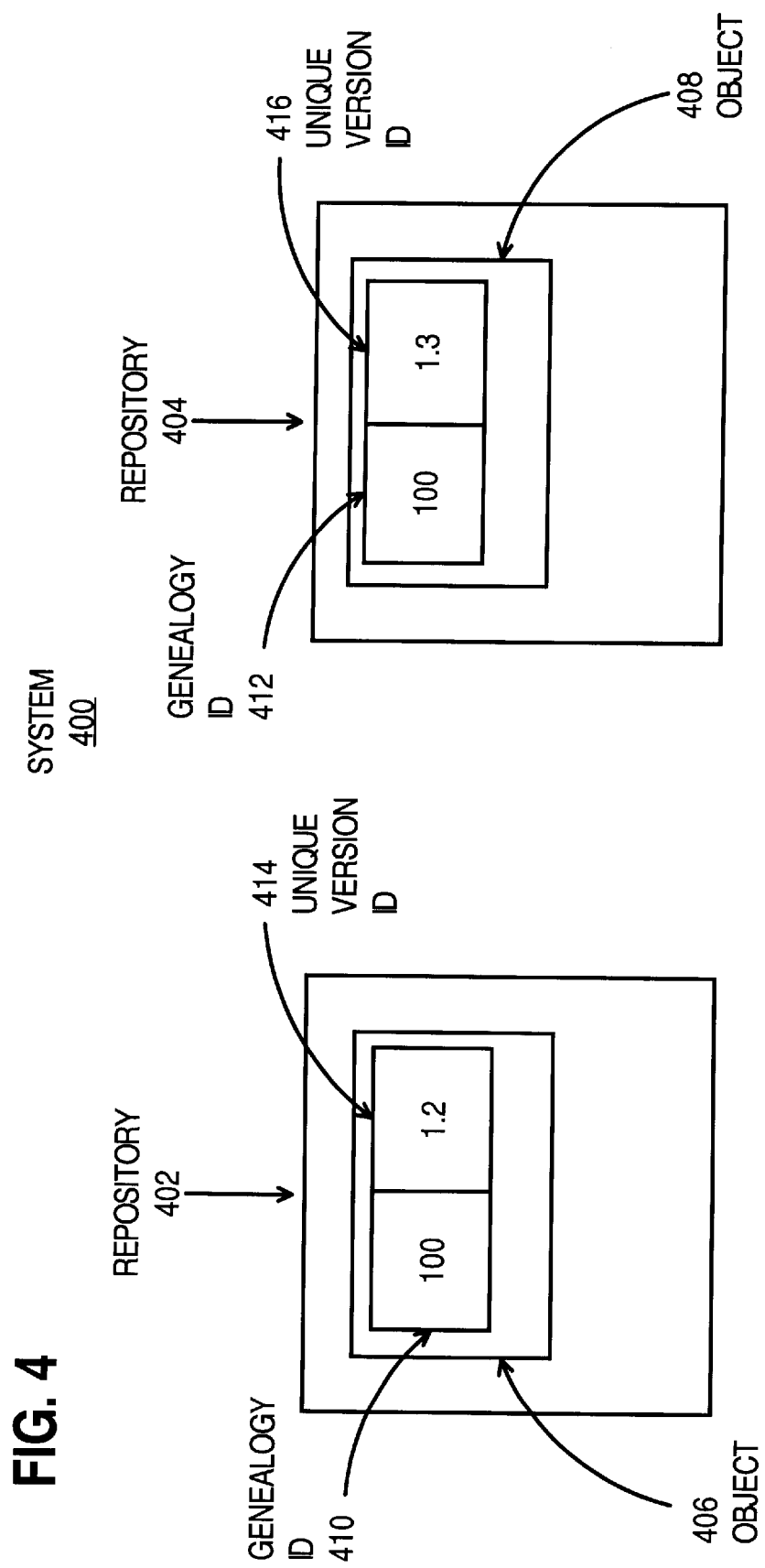
FIG. 4 illustrates a system in which multiple repositories are used.

For example, FIG. 4 illustrates a system 400 in which multiple repositories 402 and 404 are used. Repository 402 includes an object 406 that has a genealogy ID 410 of "100" and a unique version ID 414 of "1.2". In this example, a separate repository 404 has been created for generating a new software release that will include certain customizations or modifications that will be specific to the new release. To generate the new release, object 406 is copied into repository 404 as object 408. As depicted, in copying object 406 into repository 404, the generated object 408 is associated with a new unique version ID 416 ("1.3") but maintains the same genealogy ID 412 ("100") as object 406. By maintaining the same genealogy ID ("100") the version control mechanism can determine that object 408 is the same object but a subsequent version of the object 406. Using this information, the version control mechanism can identify and manage customizations or modifications that are made to objects for a particular software release or "bug fix".

Check-In and Check-Out

In one embodiment, a set of APIs are provided that allow a user to checkout and check-in, objects from the repository. When an object is checked-out, the version control mechanism automatically creates a new version of the object and places it in the user's workspace. The user may then modify and update the object as necessary. In one embodiment, in checking-out an object, the API manipulates the set of configurations that is defining the user workspace area.

Once the user has completed the changes, the object may then be checked back into the repository. Once an object is checked-in, that specific version can no longer be modified. Thus, if a different user, or even the same user, wants to make additional changes to the object, the object must again be checked-out from the repository. This additional checkout will cause yet another version of the object to be generated and placed in the user's workspace.

According to one embodiment, the same object may be checked out concurrently by more then one user or tool. When an object is checked-out, the tools that checked the object out continue to see the object from their own context. Thus, a single object may be modified in parallel as each tool is presented with its own version of the particular object. In addition, if a user requires the changes that were made by someone else, the user may checkout the updated object by causing a version of the object to be generated and placed in the user's workspace. This scheme allows changes to objects to be passed from one user to another but without forcing any unwanted change on a user.

In certain embodiments, the version control mechanism may be used to prohibit an object from being checked-out by multiple users. For example, in certain development environments, it may be advantages to only allow a single user to modify a particular object at any one point in time.

In one embodiment, when an object is checked-out in parallel by multiple users, when the first person checks the object back in, it is merely checked in as the "latest version". However, when the other users that had concurrently checked out the object go to check their objects back in, they must choose to either (1) create a version that merges the changes they made with the "latest version", or (2) store their version as a separate branch in the family of the object. Any changes made to that version remain in the separate branch until the branch is merged back into the other branch.

Utilities

The version control mechanism provides a set of utilities that automate the process of making software changes. This set of utilities may include such utilities as:

(1) A workarea management utility that provides a set of tools for defining work areas and performing check-out and check-in operations on objects of all types;

(2) A compare and merge utility that discovers or determines the differences between two objects and allows a third merged object to be constructed by selecting between the two inputs;

(3) An impact analysis utility that allows a user to compare and analyze the changes made from one software release to another;

(4) An export and import utility that provides a mechanism for distributing the contents of a repository from one repository to another; and (5) A backup and restore utility that protects the content of a repository from corruption by making backup copies.

Hardware Overview

Figure 6:
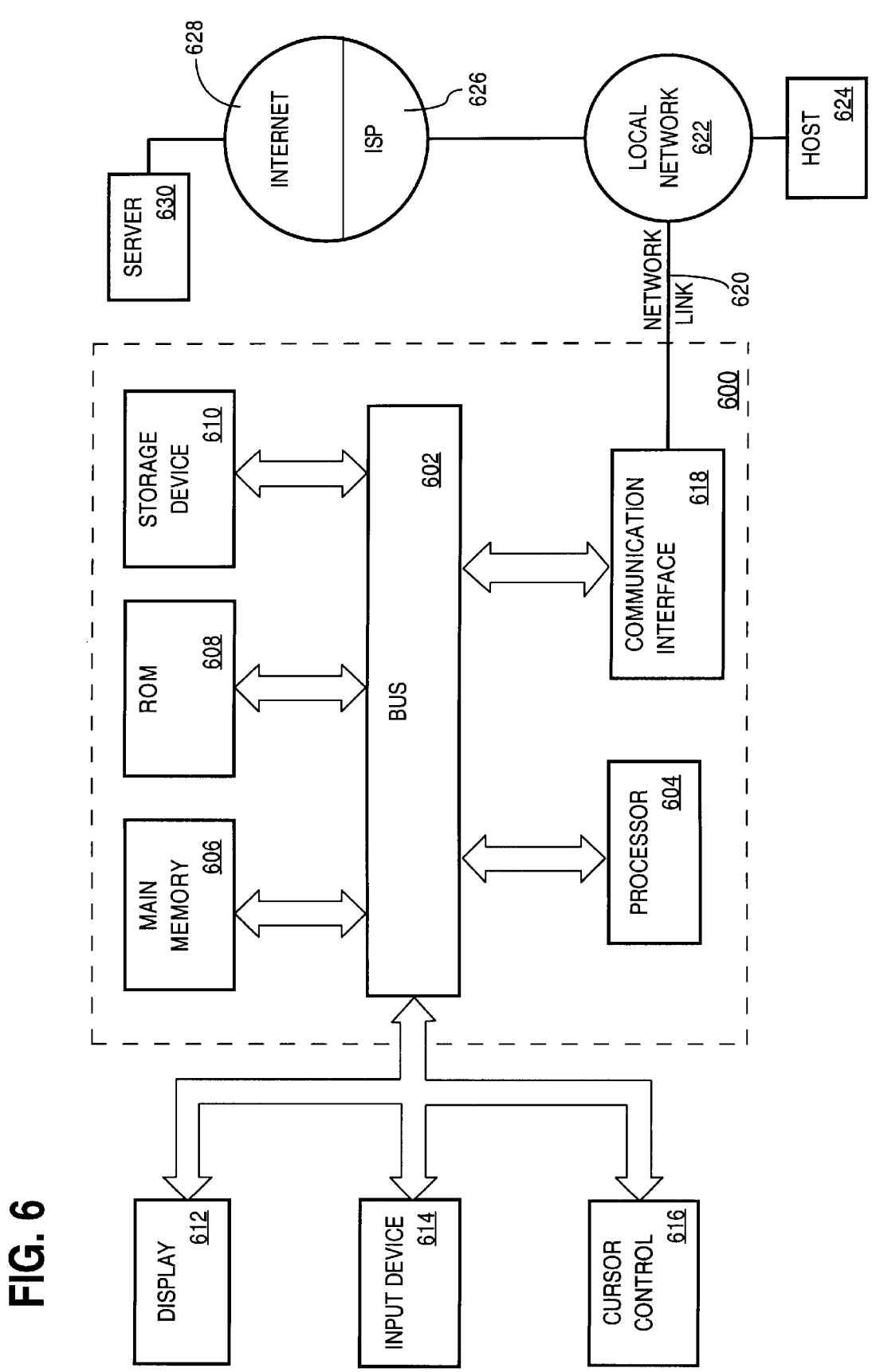
FIG. 6 is a block diagram of a computer system hardware arrangement that can be used to implement certain aspects of the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing fine grain versioning within software configuration management systems. According to one embodiment of the invention, fine grain versioning is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for implementing fine grain versioning within software configuration management systems as described herein.

The received code may be executed by processor 604 as it is received, and/or stored in storage device 610, or other non-volatile storage for later execution. In this manner, computer system 600 may obtain application code in the form of a carrier wave.

Alternatives, Extentions

In the foregoing specification, embodiments of the invention have been described with reference to specific examples. It will, however, be evident that various modifications and changes may be made thereto without departing from the broader spirit and scope of the invention. The specification and drawings are, accordingly, to be regarded in an illustrative rather than a restrictive sense. For example, the version control mechanism may be implemented using a variety of different computer languages. Thus, although certain examples have depicted the use of specific computer languages, embodiments of the invention are not limited to the use of any particular computer language. For example, in one embodiment, the version control mechanism generates its APIs using the Java™ programming language.

In addition, within this disclosure, including the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for converting a non-versioned schema to a version-enabled schema, the method comprising the steps of:

reading a first set of table definitions that belong to the non-versioned schema;

generating a second set of table definitions for the version-enabled schema, wherein each table definition in said second set of table definitions corresponds to a table definition in said first set of table definitions; and wherein each table definition in the second set of table definitions includes
(a) columns that correspond to the columns of the corresponding table definition in the first set of table definitions; and
(b) one or more additional columns for storing version information.

2. The method of claim 1, further comprising the steps of:

importing objects stored in the non-versioned schema into the version-enabled schema; and assigning a version ID to each of the objects.

3. The method of claim 1, further comprising the step of maintaining the second set of table definitions in one or more data repositories, wherein the one or more data repositories are based on a relational database.

4. The method of claim 3, further including the step of generating one or more views that insolate existing tools from the additional version information, wherein the one or more views project data to the existing tools exactly as the non-versioned schema.

5. The method of claim 1, wherein the step of generating a second set of table definitions further includes the steps of:

populating a table of objects with data maintained in the non-version schema, wherein the table of objects includes one or more object entries; and assigning to each of the one or more object entries a genealogy ID and a unique version ID.

6. The method of claim 5, further comprising the steps of:

establishing one or more configurations, wherein each configuration includes one or more objects; and wherein for each configuration, no two objects include both the same genealogy ID and same unique version ID.

7. The method of claim 6, further comprising the steps of:

establishing one or more workspace areas, wherein each workspace area includes one or more configurations; and wherein for each workspace area, no two configurations contain objects that include both the same genealogy ID and same unique version ID.

8. The method of claim 2, further comprising the steps of assigning a genealogy ID to each of the objects, wherein the genealogy ID indicates a family history for each object.

9. The method of claim 8, further comprising the step of:

providing a checkout mechanism for checking-out objects from the second set of tables, wherein the checkout mechanism causes a new object version to be generated for each object that is checked-out.

10. The method of claim 8, further comprising the step of:

receiving requests from multiple users to checkout a particular object from the second set of tables; and in response to receiving the requests, causing a new version of the particular object to be generated for each request, wherein each new version of the particular object is associated with a different version ID.

11. A method for providing version support for objects stored in a relational database system, the method comprising the steps of:
creating a table that includes
a first set of one or more columns for storing values that correspond to attributes of objects, and
a second set of one or more columns for storing object version information;
storing within said table multiple versions of a particular object; in response to a request from a user to retrieve said particular object, performing the steps of
determining a version of said particular object to present to said user based on a workspace associated with the user; and
presenting said version of said particular object to said user without exposing values from said second set of one or more columns to said user.

12. The method of claim 11, wherein:

the second set of one or more columns includes columns for storing a genealogy ID and a unique version ID for each object entry; and further comprising the steps of
establishing one or more configurations, wherein each configuration includes one or more objects; and
wherein for each configuration, no two objects include both the same genealogy ID and same unique version ID.

13. The method of claim 12, further comprising the steps of:

establishing one or more workspace areas, wherein each workspace area includes one or more configurations; and wherein for each workspace area, no two configurations contain objects that include both the same genealogy ID and same unique version ID.

14. The method of claim 11, further comprising the steps of assigning a genealogy ID and a version ID to each of the objects, wherein the genealogy ID indicates a particular object family for which the particular object belongs and the version ID identifies a particular version of the object within the particular object family.

15. The method of claim 14, further comprising the step of:

providing a checkout mechanism for checking-out objects from the table, wherein the checkout mechanism causes a new object version to be generated for each object that is checked-out.

16. The method of claim 14, further comprising the step of:

receiving requests from multiple users to checkout a particular object from the table; and in response to receiving the requests, causing a new version of the particular object to be generated for each request, wherein each new version of the particular object is associated with a different version ID.

17. A computer-readable medium carrying one or more sequences of one or more instructions for converting a non-versioned schema to a version-enabled schema, the one or more sequences of one or more instructions including instructions which, when executed by one or more processors, cause the one or more processors to perform the steps of:

reading a first set of table definitions that belong to the non-versioned schema;

generating a second set of table definitions for the version-enabled schema, wherein each table definition in said second set of table definitions corresponds to a table definition in said first set of table definitions; and wherein each table definition in the second set of table definitions includes (a) columns that correspond to the columns of the corresponding table definition in the first set of table definitions; and (b) one or more additional columns for storing version information.

18. The computer-readable medium of claim 17, further comprising the steps of:

importing objects stored in the non-versioned schema into the version-enabled schema; and assigning a version ID to each of the objects.

19. The computer-readable medium of claim 17, further comprising the step of maintaining the second set of table definitions in one or more data repositories, wherein the one or more data repositories are based on a relational database.

20. The computer-readable medium of claim 19, further including the step of generating one or more views that insolate existing tools from the additional version information, wherein the one or more views project data to the existing tools exactly as the non-versioned schema.

21. The computer-readable medium of claim 17, wherein the step of generating a second set of table definitions further includes the steps of:

populating a table of objects with data maintained in the non-version schema, wherein the table of objects includes one or more object entries; and assigning to each of the one or more object entries a genealogy ID and a unique version ID.

22. The computer-readable medium of claim 21, further comprising the steps of:

establishing one or more configurations, wherein each configuration includes one or more objects; and wherein for each configuration, no two objects include both the same genealogy ID and same unique version ID.

23. The computer-readable medium of claim 22, further comprising the steps of:

establishing one or more workspace areas, wherein each workspace area includes one or more configurations; and wherein for each workspace area, no two configurations contain objects that include both the same genealogy ID and same unique version ID.

24. The computer-readable medium of claim 18, further comprising the steps of assigning a genealogy ID to each of the objects, wherein the genealogy ID indicates a family history for each object.

25. The computer-readable medium of claim 24, further comprising the step of:

providing a checkout mechanism for checking-out objects from the second set of tables, wherein the checkout mechanism causes a new object version to be generated for each object that is checked-out.

26. The computer-readable medium of claim 24, further comprising the step of:

receiving requests from multiple users to checkout a particular object from the second set of tables; and in response to receiving the requests, causing a new version of the particular object to be generated for each request, wherein each new version of the particular object is associated with a different version ID.

27. A computer-readable medium carrying one or more sequences of one or more instructions for providing version support for objects stored in a relational database system, the one or more sequences of one or more instructions including instructions which, when executed by one or more processors, cause the one or more processors to perform the steps of:

creating a table that includes a first set of one or more columns for storing values that correspond to attributes of objects, and a second set of one or more columns for storing object version information;

storing within said table multiple versions of a particular object;

in response to a request from a user to retrieve said particular object, performing the steps of determining a version of said particular object to present to said user based on a workspace associated with the user; and presenting said version of said particular object to said user without exposing values from said second set of one or more columns to said user.

28. The computer-readable medium of claim 27, wherein:

the second set of one or more columns includes columns for storing a genealogy ID and a unique version ID for each object entry; and further comprising the steps of establishing one or more configurations, wherein each configuration includes one or more objects; and wherein for each configuration, no two objects include both the same genealogy ID and same unique version ID.

29. The computer-readable medium of claim 28, further comprising the steps of:

establishing one or more workspace areas, wherein each workspace area includes one or more configurations; and wherein for each workspace area, no two configurations contain objects that include both the same genealogy ID and same unique version ID.

30. The computer-readable medium of claim 27, further comprising the steps of assigning a genealogy ID and a version ID to each of the objects, wherein the genealogy ID indicates a particular object family for which the particular object belongs and the version ID identifies a particular version of the object within the particular object family.

31. The computer-readable medium of claim 30, further comprising the step of:

providing a checkout mechanism for checking-out objects from the table, wherein the checkout mechanism causes a new object version to be generated for each object that is checked-out.

32. The computer-readable medium of claim 30, further comprising the step of:

receiving requests from multiple users to checkout a particular object from the table; and in response to receiving the requests, causing a new version of the particular object to be generated for each request, wherein each new version of the particular object is associated with a different version ID.

33. A computer system for converting a non-versioned schema to a version-enabled schema, the computer system comprising:

a memory;

one or more processors coupled to the memory; and a set of computer instructions contained in the memory, the set of computer instructions including computer instructions which when executed by the one or more processors, cause the one or more processors to perform the steps of:

reading a first set of table definitions that belong to the non-versioned schema;

generating a second set of table definitions for the version-enabled schema, wherein each table definition in said second set of table definitions corresponds to a table definition in said first set of table definitions; and wherein each table definition in the second set of table definitions includes (a) columns that correspond to the columns of the corresponding table definition in the first set of table definitions; and (b) one or more additional columns for storing version information.

34. A computer system for providing version support for objects stored in a relational database system, the computer system comprising:

a memory;

one or more processors coupled to the memory; and a set of computer instructions contained in the memory, the set of computer instructions including computer instructions which when executed by the one or more processors, cause the one or more processors to perform the steps of:

creating a table that includes a first set of one or more columns for storing values that correspond to attributes of objects, and a second set of one or more columns for storing object version information;

storing within said table multiple versions of a particular object;

in response to a request from a user to retrieve said particular object, performing the steps of determining a version of said particular object to present to said user based on a workspace associated with the user; and presenting said version of said particular object to said user without exposing values from said second set of one or more columns to said user.

* * * * *